(12) United States Patent
Schaller et al.

(10) Patent No.: US 7,726,494 B2
(45) Date of Patent: *Jun. 1, 2010

(54) DENSITY CURRENT BAFFLE FOR A CLARIFIER TANK

(76) Inventors: Earle Schaller, 32 Bermuda Lake Dr., Palm Beach Gardens, FL (US) 33418; Elaine Schaller, 32 Bermuda Lake Dr., Palm Beach Gardens, FL (US) 33418

(*) Notice: Subject to any disclaimer, the term of this patent is extended or adjusted under 35 U.S.C. 154(b) by 0 days.

This patent is subject to a terminal disclaimer.

(21) Appl. No.: 11/986,783

(22) Filed: Nov. 26, 2007

(65) Prior Publication Data

US 2008/0230463 A1   Sep. 25, 2008

Related U.S. Application Data

(60) Provisional application No. 60/899,327, filed on Feb. 2, 2007.

(51) Int. Cl.
 *B01D 21/02* (2006.01)
(52) U.S. Cl. .................. 210/521; 210/528; 210/532.1; 210/539; 210/541; 220/660
(58) Field of Classification Search ................ 210/521, 210/525, 528, 532.1, 539, 541; 220/654, 220/660
 See application file for complete search history.

(56) References Cited

U.S. PATENT DOCUMENTS

| 707,567 | A |   | 8/1902 | Edson |
|---|---|---|---|---|
| 1,815,159 | A | * | 7/1931 | Nordell ............ 210/528 |
| RE20,761 | E | * | 6/1938 | Pruss ............ 210/528 |
| 2,150,157 | A |   | 3/1939 | Franklin |
| 2,422,394 | A |   | 6/1947 | Carter |
| 2,509,933 | A |   | 5/1950 | Lind |
| 2,679,477 | A |   | 5/1954 | Kivari et al. |
| 2,790,372 | A |   | 4/1957 | Cooper |
| 2,826,306 | A |   | 3/1958 | Burns |
| 3,184,065 | A |   | 5/1965 | Bradford |
| 3,353,676 | A | * | 11/1967 | Adler ............ 210/528 |
| 3,385,786 | A |   | 5/1968 | Klock |
| 3,489,287 | A |   | 1/1970 | Streander |
| 3,849,311 | A |   | 11/1974 | Jakubek |

(Continued)

FOREIGN PATENT DOCUMENTS

EP   959405929   11/1995

(Continued)

OTHER PUBLICATIONS

International Search Report dated Oct. 12, 2007.

(Continued)

*Primary Examiner*—Christopher Upton
(74) *Attorney, Agent, or Firm*—Sofer & Haroun, LLP

(57) ABSTRACT

A density current baffle for use in a clarifier tank maintains a first baffle portion having a lower end, an upper end and an intermediate central portion. The lower end of the baffle portion is coupled to a side wall of the clarifier tank and the upper end of the baffle portion is disposed, at a predefined angle, away from the side wall of the clarifier tank such that the first baffle portion slopes upwardly and away from the side wall.

17 Claims, 13 Drawing Sheets

U.S. PATENT DOCUMENTS

| | | | |
|---|---|---|---|
| 4,011,164 A | 3/1977 | McGivern | |
| 4,053,421 A * | 10/1977 | Pentz et al. | 210/528 |
| 4,202,778 A | 5/1980 | Middelbeek | |
| 4,346,005 A | 8/1982 | Zimmerman | |
| 4,380,748 A | 4/1983 | Hill | |
| 4,390,422 A | 6/1983 | Mackrle | |
| 4,391,704 A | 7/1983 | Anderson | |
| 4,531,455 A | 7/1985 | Palmer | |
| 4,584,802 A | 4/1986 | Casselman | |
| 4,613,434 A | 9/1986 | Maatta | |
| 4,664,794 A | 5/1987 | Mackrle | |
| 4,706,418 A | 11/1987 | Stewart | |
| 4,710,292 A | 12/1987 | DeVos | |
| 4,758,339 A | 7/1988 | Vellinga | |
| 4,767,536 A | 8/1988 | Roley | |
| 4,780,206 A | 10/1988 | Beard | |
| 4,816,157 A | 3/1989 | Jennelle | |
| 4,830,748 A | 5/1989 | Hall | |
| 4,847,926 A | 7/1989 | Laputka | |
| 4,876,010 A | 10/1989 | Riddle | |
| 4,899,505 A | 2/1990 | Williamson | |
| 5,049,278 A | 9/1991 | Galper | |
| 5,139,657 A | 8/1992 | Nojima | |
| 5,176,823 A | 1/1993 | Roley | |
| 5,227,077 A | 7/1993 | Shea | |
| 5,252,205 A | 10/1993 | Schaller | 210/232 |
| 5,286,392 A | 2/1994 | Shea | |
| 5,344,563 A | 9/1994 | Noyes | |
| 5,597,483 A | 1/1997 | Schaller | |
| 5,670,045 A | 9/1997 | Schaller | |
| 5,688,400 A * | 11/1997 | Baxter, Sr. | 210/525 |
| 5,965,023 A | 10/1999 | Schaller | |
| 6,113,800 A | 9/2000 | Hopkins et al. | 210/703 |
| 6,216,881 B1 | 4/2001 | Schaller | |
| 6,712,222 B2 | 3/2004 | Schaller | |
| 7,416,662 B2 * | 8/2008 | Aditham et al. | 210/541 |

FOREIGN PATENT DOCUMENTS

| | | |
|---|---|---|
| JP | 3408542 | 3/2003 |

OTHER PUBLICATIONS

International Search Report dated Jul. 25, 2008.
Preliminary Report on Patentability from the International Bureau for PCT/2007/021901.
Preliminary Report on Patentability from the International Bureau for PCT/2007/024433.

* cited by examiner

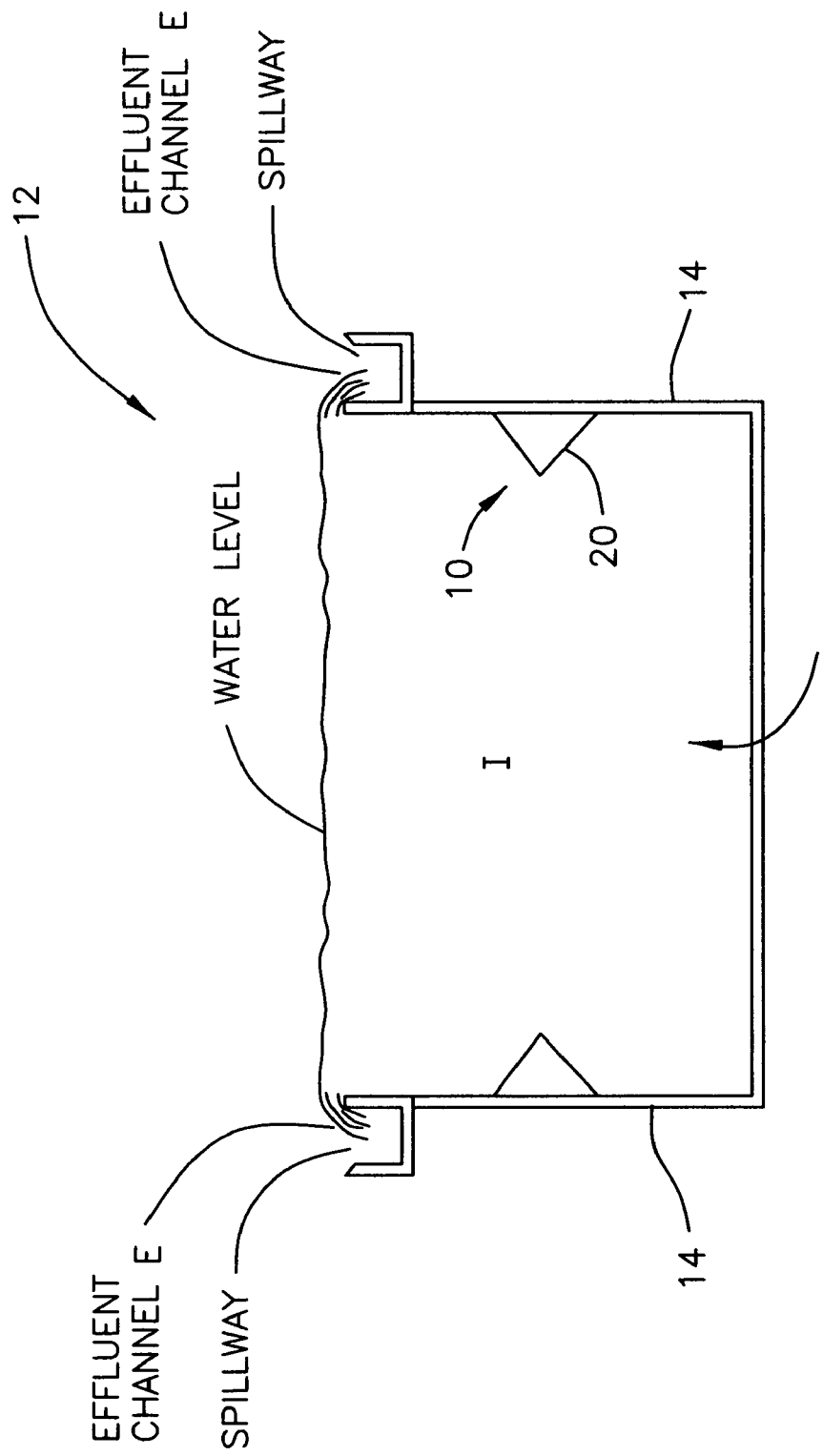
FIG. 1

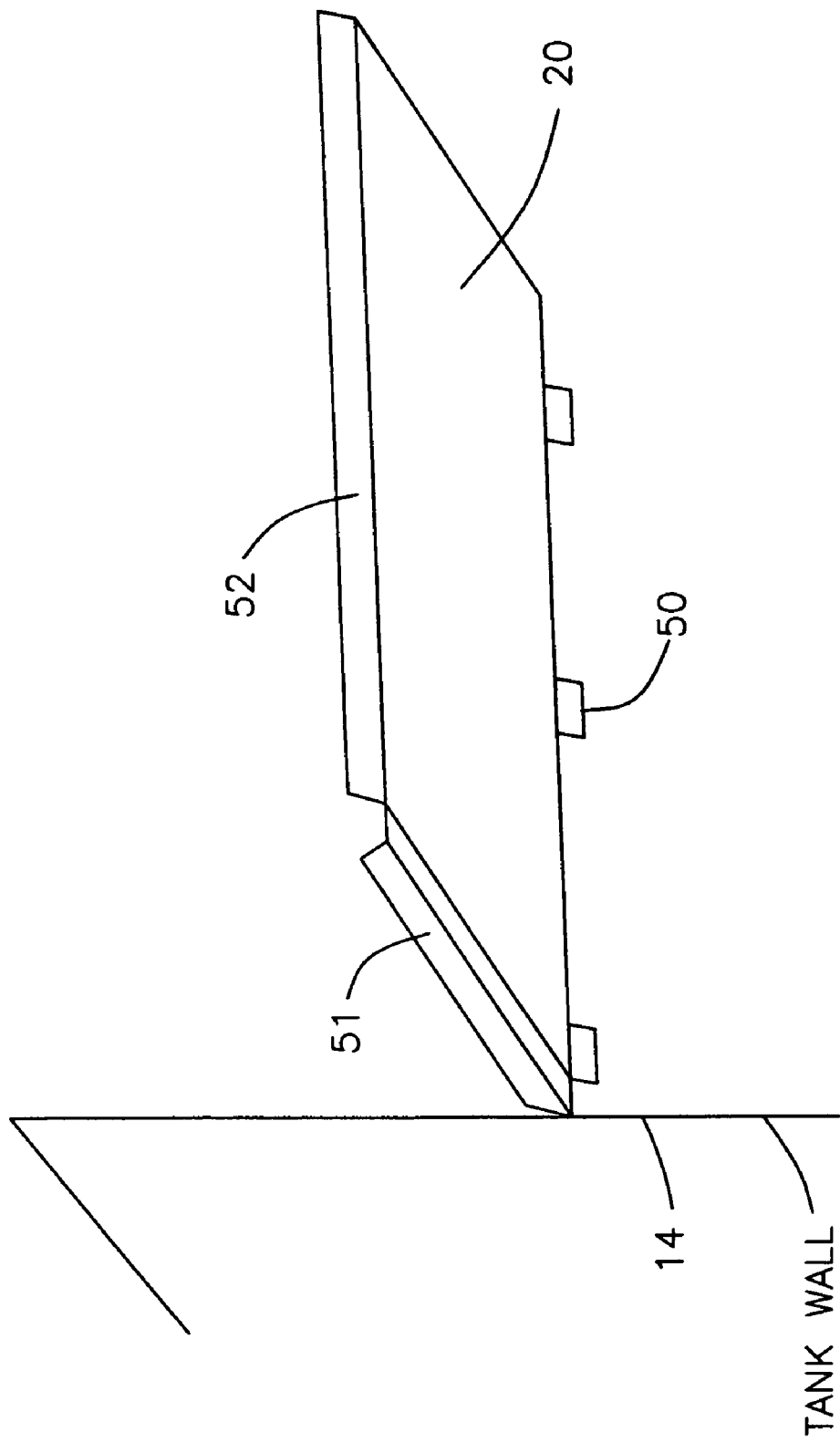
FIG. 2

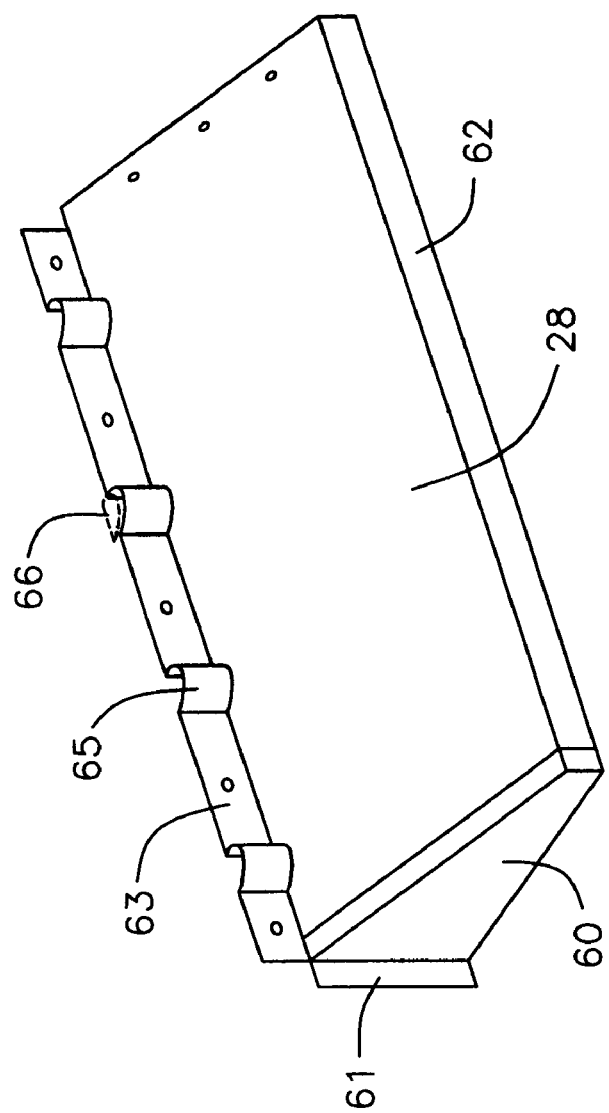
FIG. 3

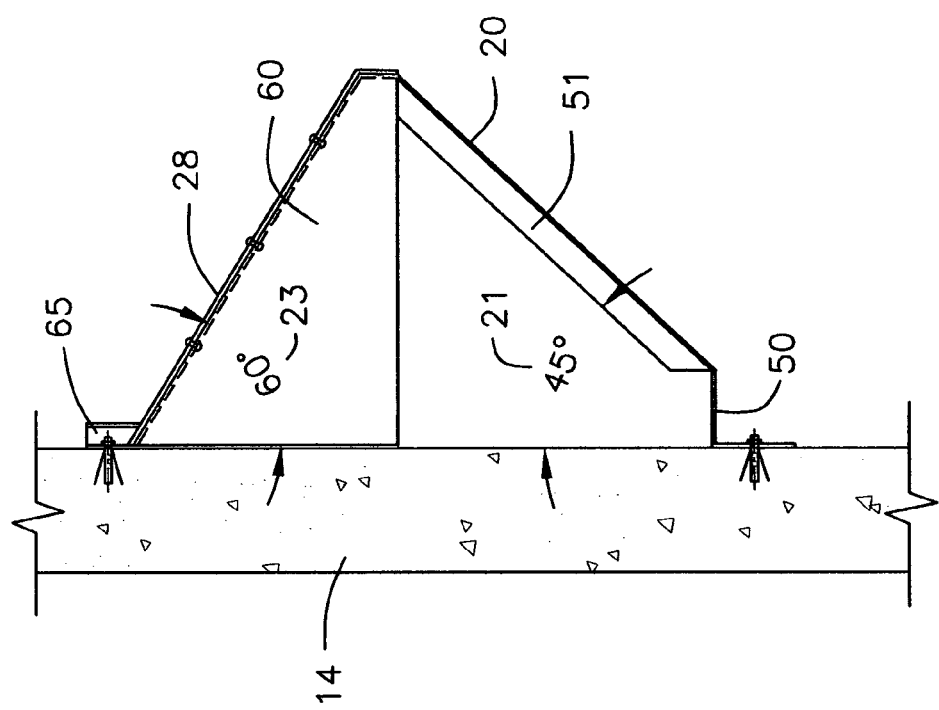
FIG. 4

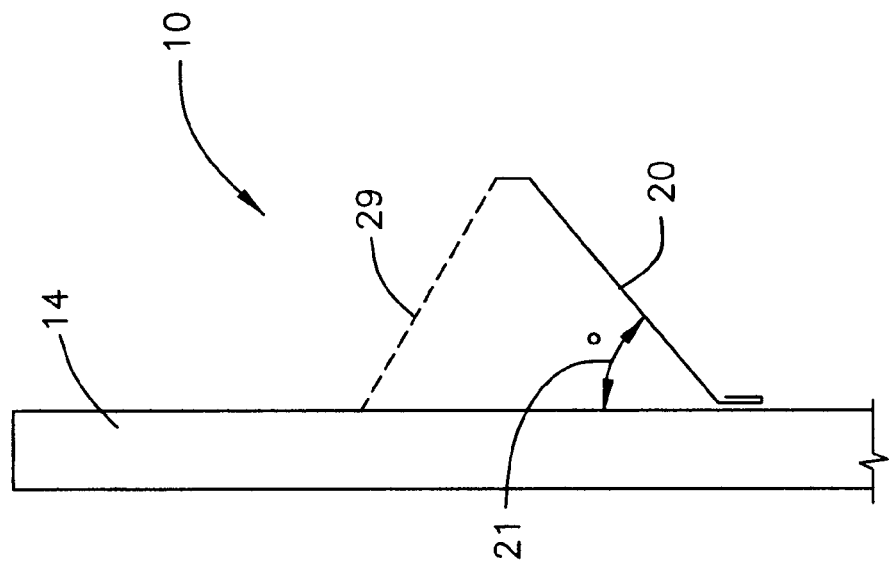
FIG. 5

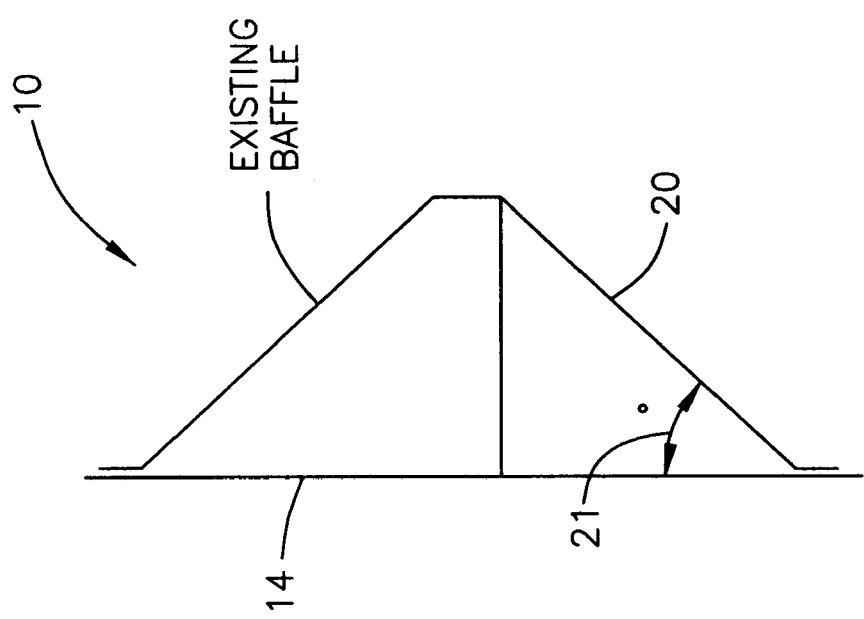
FIG. 6

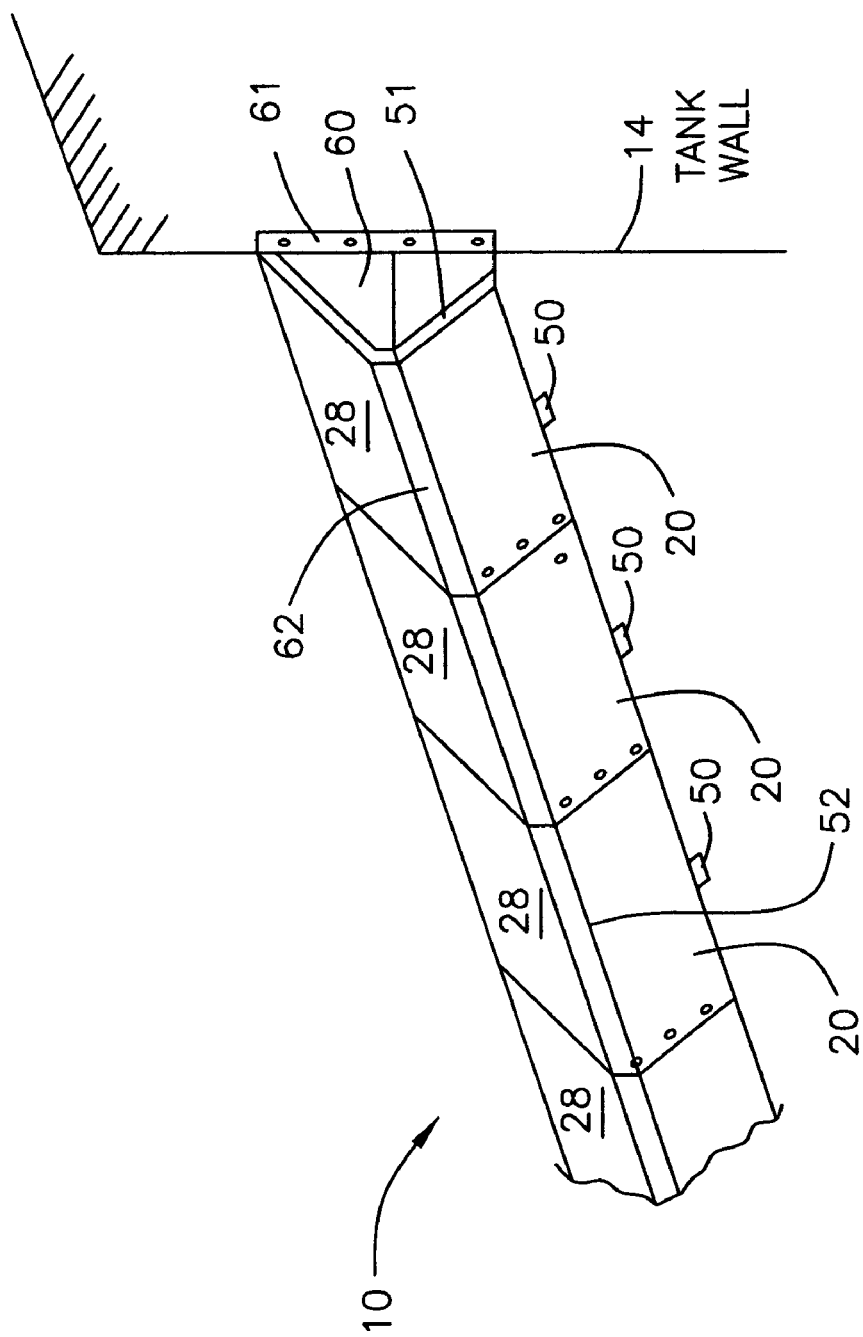
FIG. 7

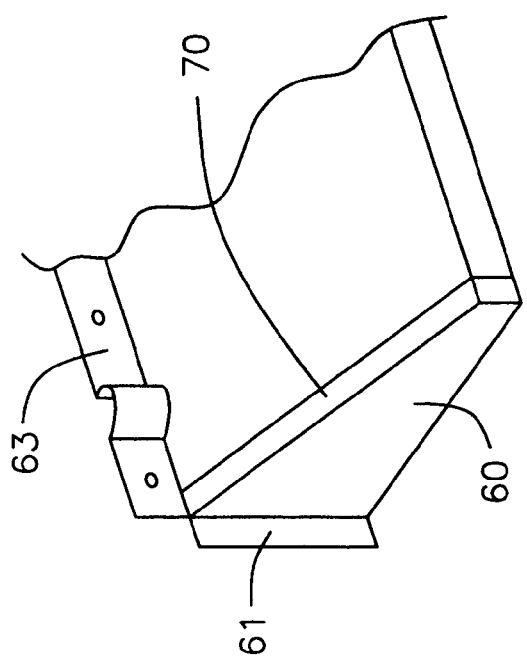
FIG. 8A
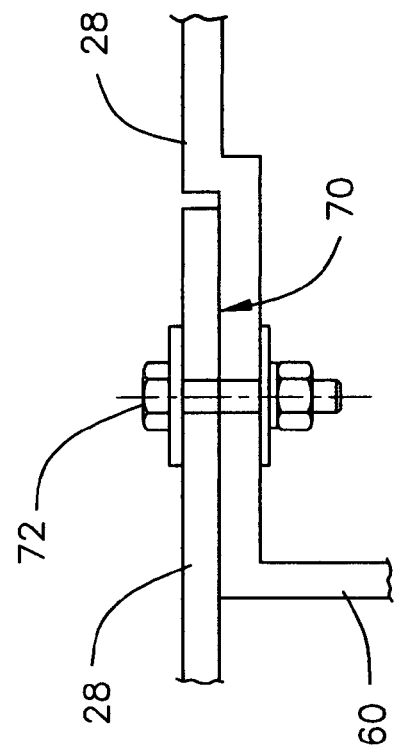
FIG. 8B

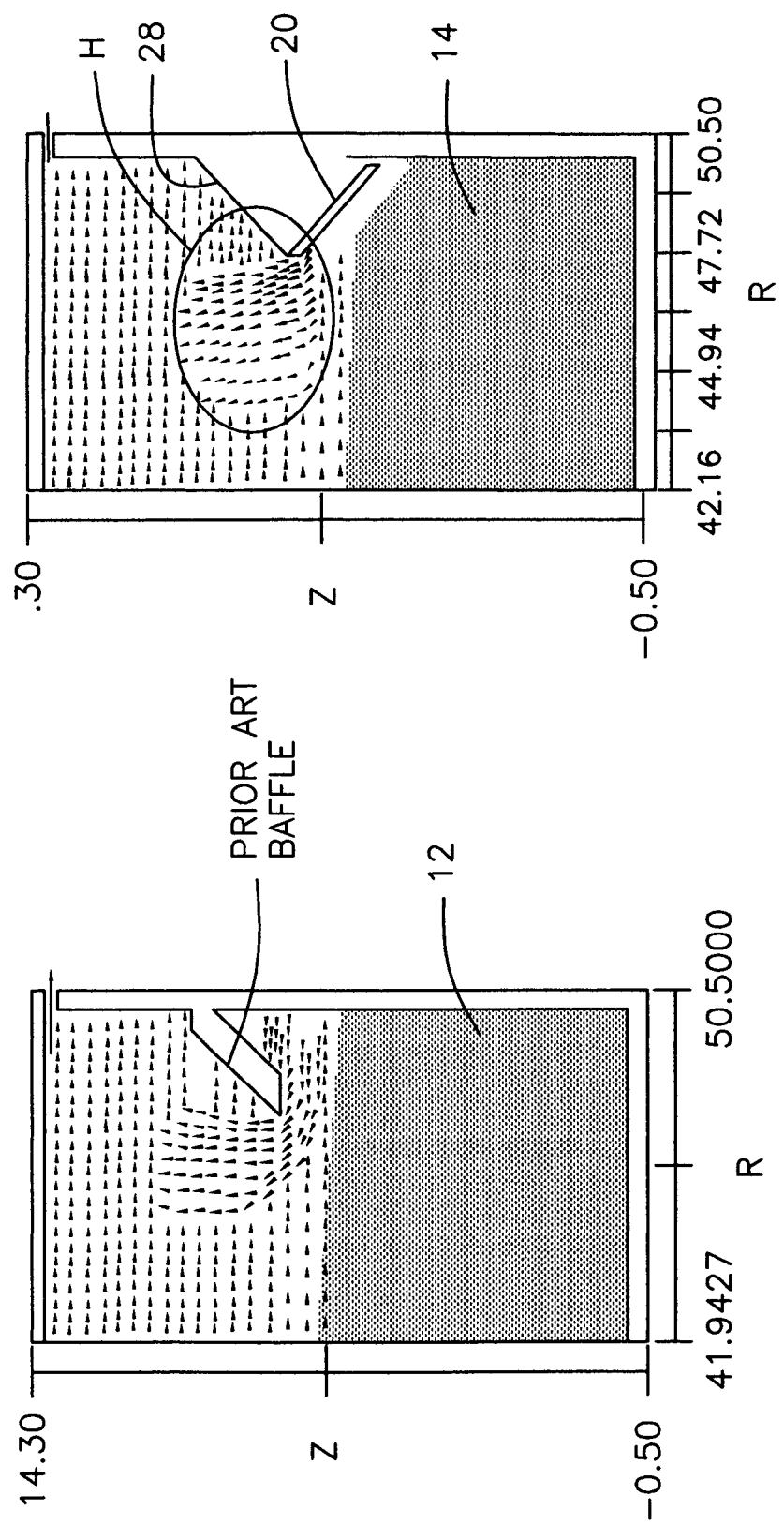
FIG. 9B
PRIOR ART
FIG. 9A

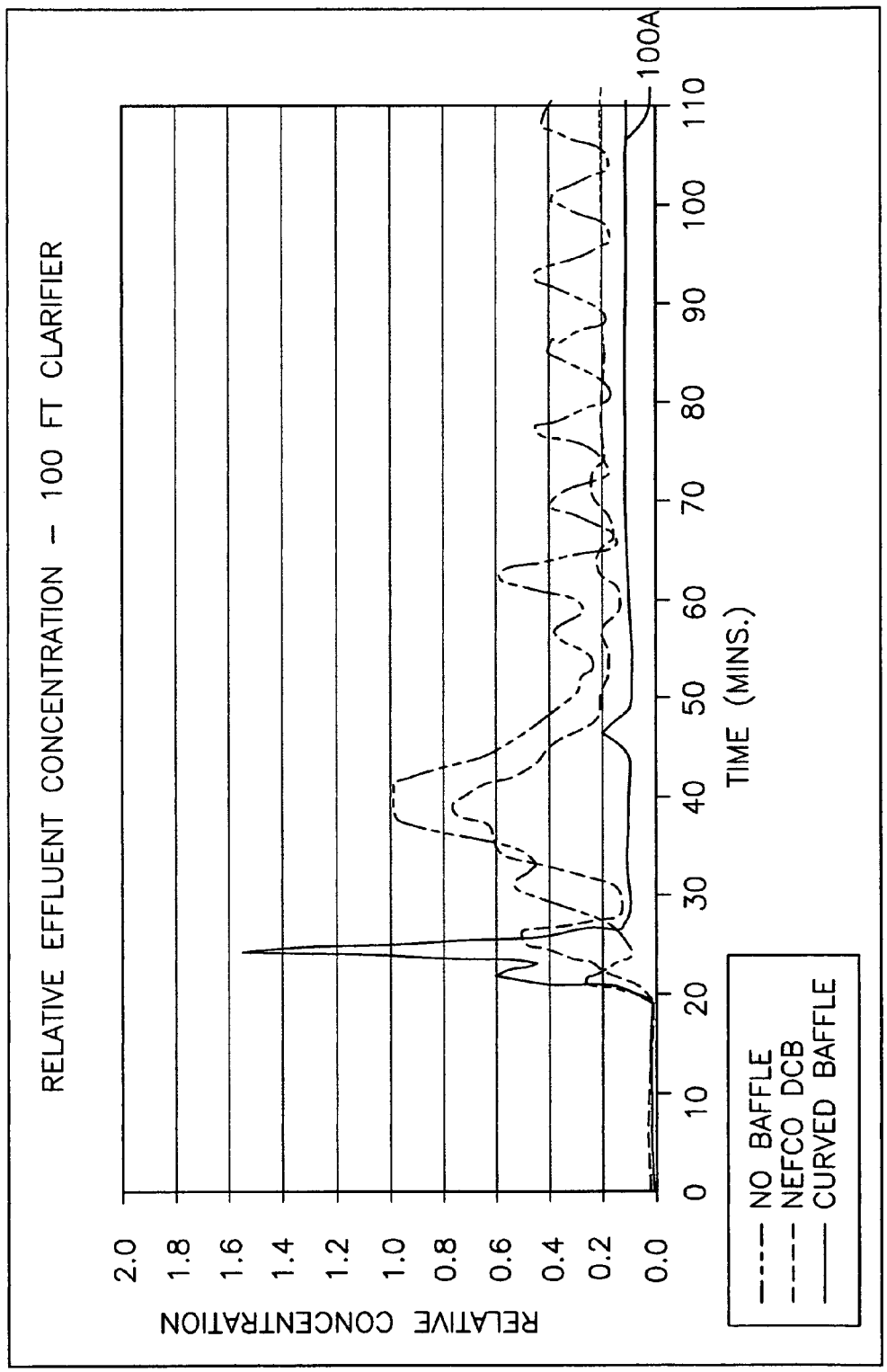
FIG. 10A

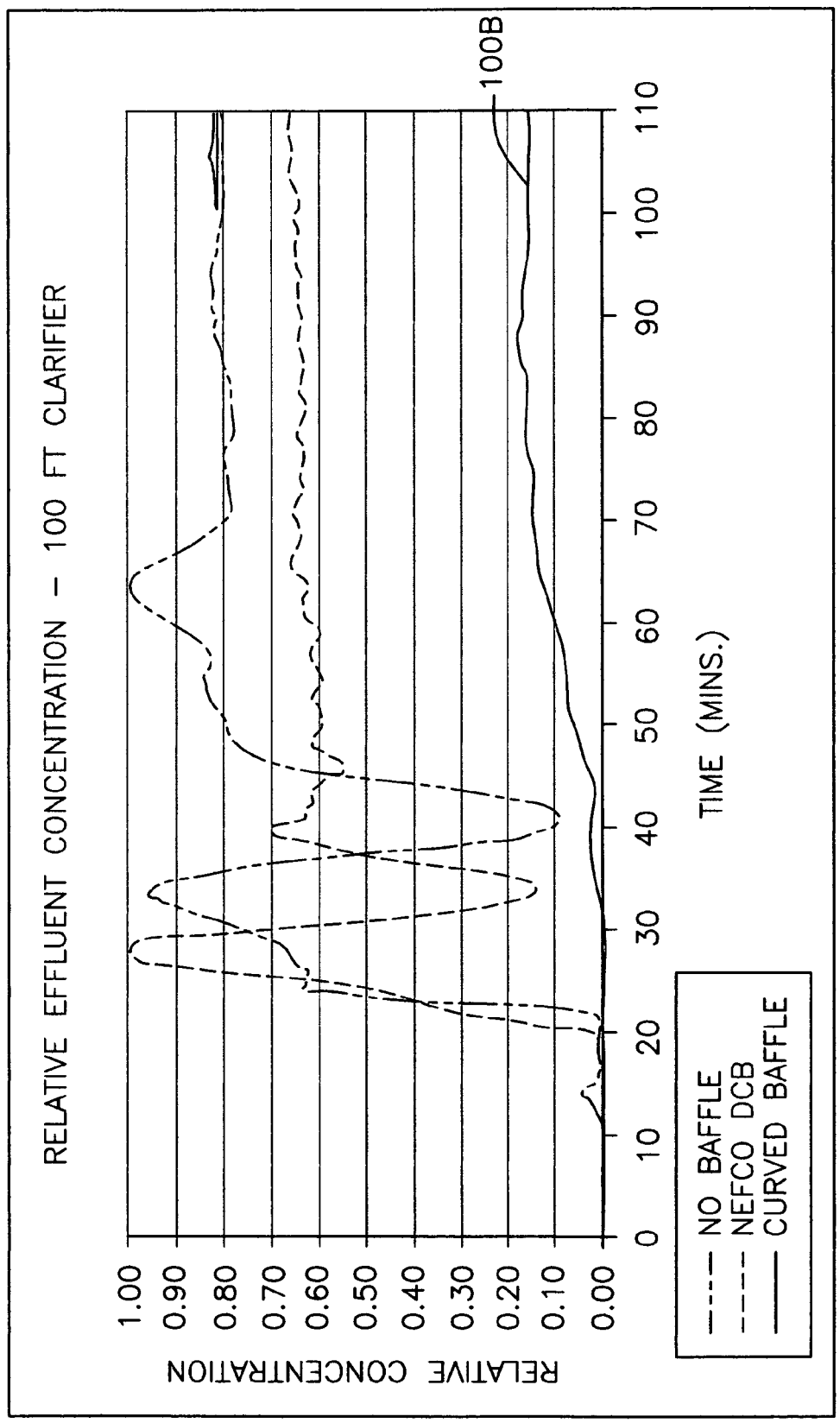
FIG. 10B

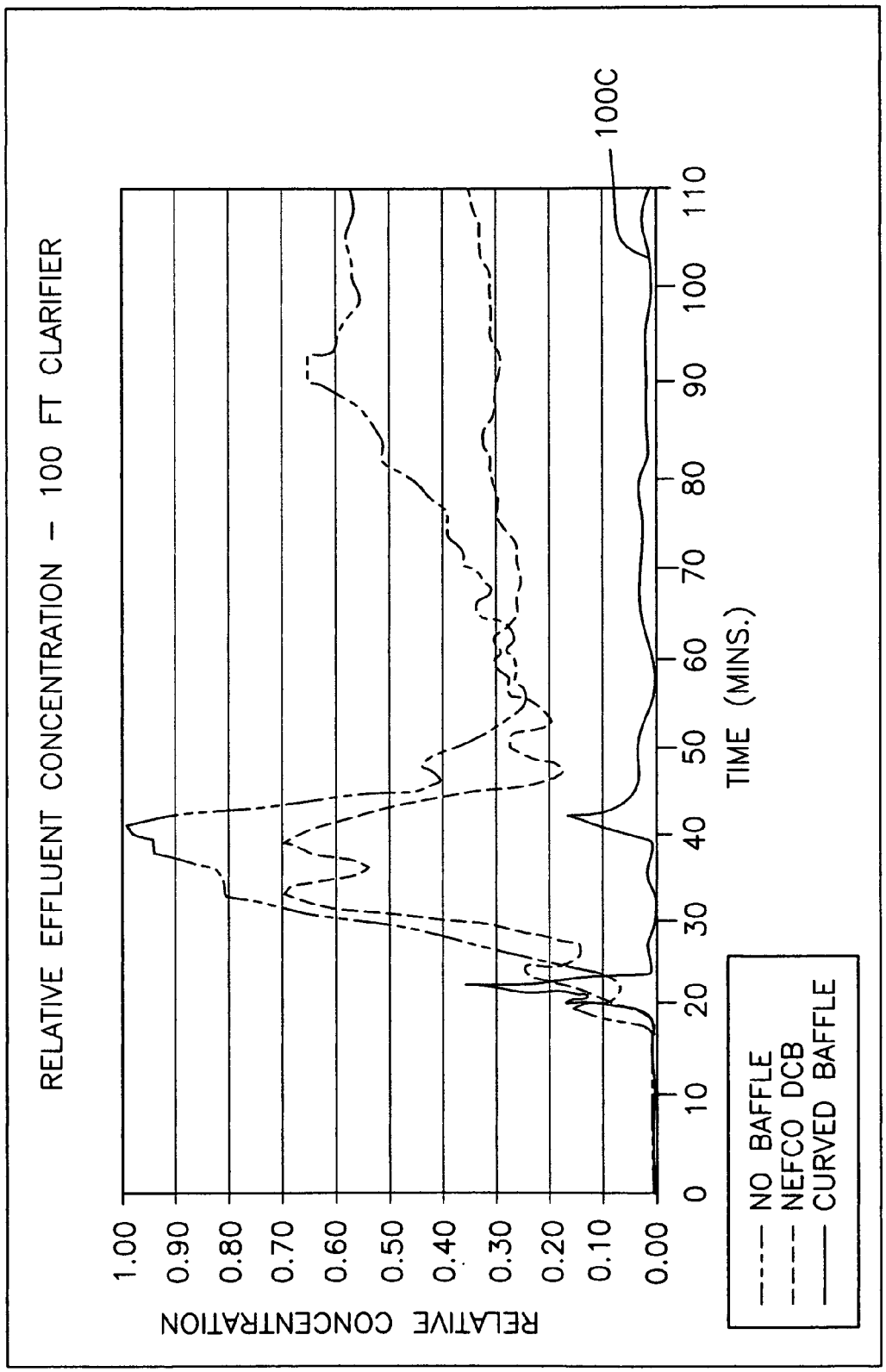
FIG. 10C

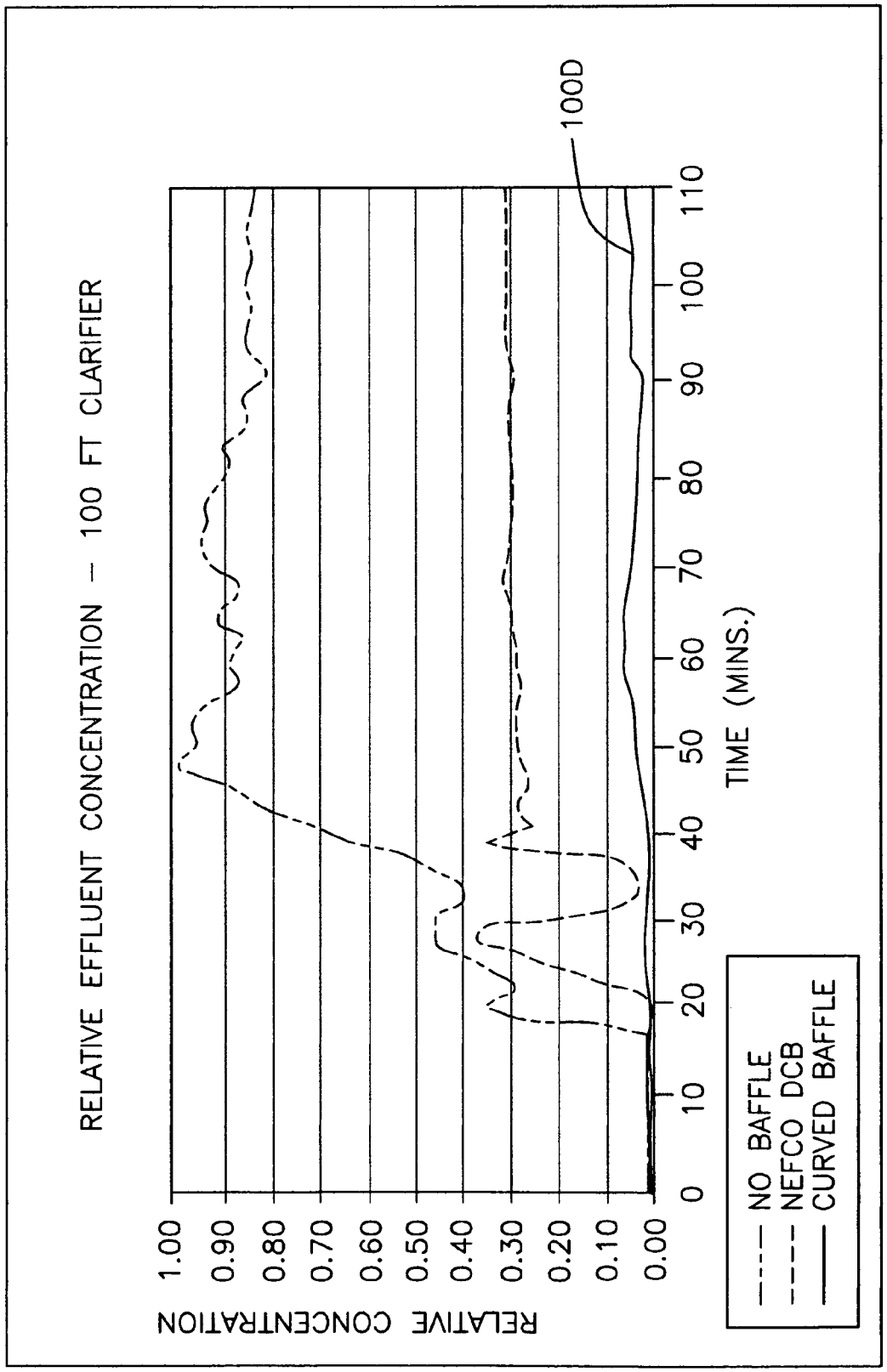
FIG. 10D

DENSITY CURRENT BAFFLE FOR A CLARIFIER TANK

RELATED APPLICATION

This application claims the benefit of priority from U.S. Provisional Patent Application No. 60/899,327 filed on Feb. 2, 2007, the entirety of which is incorporated herein by reference.

FIELD OF THE INVENTION

The present invention is in the field of wastewater treatment clarifier tanks. More particularly, the present invention is in the field of density current baffles used in clarifier tanks.

BACKGROUND

In the field of waste water treatment, clarifier tanks are used to separate waste solids from the water as one of the last stages of treatment. The clarifier tanks typically consist of a circular or rectangularly-configured tank in which a centrally mounted, radially-extending arm is slowly moved or rotated about the tank at or proximate the surface of the carrier liquid.

Waste water enters the tank either through the bottom of the tank or through some other entry port. Thereafter, the aim is to have the solid waste, or sludge, settle to the bottom of the tank with the cleaner water escaping over a weir into an effluent or launder channel before final processing and release to the environment.

A major deterrent to effective solids removal is the presence of sludge density currents that form within the tank. These currents create hydraulic short circuits that bypass the tanks' main clarification volume and allow solids to enter the effluent. The effectiveness of clarifier tanks is measured in the amount of total suspended solids (TSS) that leave the clarifier tank through the effluent channel.

In order to reduce the TSS output into the effluent channel, a number of modifications have been made to these tanks, one of which is commonly referred to as a density current baffle. These baffles, situated along the outer wall of the tank, facing inward and downward, are designed to redirect these currents back towards the center of the tank and thus away from the effluent channel.

In the past several attempts have been made to design effective bafflers for such clarifier tanks.

For example, U.S. Pat. No. 4,780,206 to Beard et al. relates to a turbulence control system for an intra-channel clarifier which reduces turbulence within and allows the removal of sludge from the clarifier.

U.S. Pat. No. 4,816,157 to Jennelle is directed to an apparatus and method for clarifying solids from a solids-containing liquid having a multilayer baffle system and integral solids removal sump. The multilayer baffle system includes a first set of baffles placed above the main liquid flow path for minimizing horizontal flow and creating local turbulence so as to promote settling and assure that no solids settle on the baffles.

U.S. Pat. No. 5,049,278 to Galper relates to a modular plate settler for use in a liquid clarifier system having one or more inlet ports for receiving an influent flow of liquid. The modular plate settler comprises a parallelogram-shaped enclosure provided with a full bottom opening for receiving the influent flow of liquid from the settling tank.

U.S. Pat. No. 5,252,205 to Schaller is directed to an improved baffle system which is constructed as a modular unit and that consists of a plurality of inter-engaged individual baffles, each formed as a unitarily-integrated element incorporating both the panel member and an integral end bracket for suspended securement of the baffle to the peripheral wall of the clarifier tank.

Finally, U.S. Pat. No. 5,597,483 to Schaller is directed to a vented baffle system where one or more of the baffles are provided with a relief valve means for venting the pressure in a space formed between the junction of the lower side of the panel member and the peripheral tank wall. The resulting system provides a vented baffle system in which pressure exerted by the build up of gases in the space may be alleviated. Both U.S. Pat. Nos. 5,252,205 and 5,597,483 are incorporated by reference.

Each of these existing baffle designs, while effective at reducing the TSS % exiting through the effluent channel, still exhibit a number of drawbacks. For example, the existing baffle designs do not perform well when the flow through the clarifier tank is low. Furthermore, the performance of these baffles depends upon their location relative to the sludge blanket, but the sludge blanket height is often unknown or changes. Yet another drawback is that the performance of existing baffle designs become unstable when the flow changes suddenly, such as after a rain storm, resulting in an increase in solids entering into the effluent channel.

OBJECTS AND SUMMARY

The present invention looks to overcome the drawbacks associated with the prior art and to provide an improved baffle design for clarifier tanks that is more effective in redirecting the flow of the density currents and the solids back toward the center of the tank, resulting in an improvement (reduction) in TSS over existing baffle designs.

To this end, the present invention is directed to a density current baffle for use in a clarifier tank. The baffle includes a first baffle portion having a lower end, an upper end and an intermediate central portion. The lower end of the baffle portion is coupled to a side wall of the clarifier tank. The upper end of the baffle portion is disposed, at a predefined angle, away from the side wall of the clarifier tank such that the first baffle portion slopes upwardly and away from the side wall.

BRIEF DESCRIPTION OF THE DRAWINGS

The present invention can be best understood through the following description and accompanying drawings, wherein:

FIG. 1 illustrates an exemplary baffle in a clarifier tank, according to one embodiment;

FIG. 2 illustrates a central baffle portion of the exemplary baffle from FIG. 1, according to one embodiment;

FIG. 3 illustrates an upper panel of the exemplary baffle from FIG. 1, according to one embodiment;

FIG. 4 illustrates an exemplary baffle from FIG. 1, according to one embodiment;

FIG. 5 illustrates an alternative baffle, according to another embodiment;

FIG. 6 illustrates an alternative baffle, according to another embodiment;

FIG. 7 illustrates an alternative consecutive baffle arrangement, according to another embodiment;

FIG. 8A is a close up of an upper panel of the exemplary baffle from FIG. 3, according to one embodiment;

FIG. 8B is a close up of adjoining upper panels from FIGS. 3 and 7, according to one embodiment;

FIG. 9A is a prior art illustration of solid waste flows in a clarifier tank having a baffle;

FIG. 9B is an illustration of the solid waste flows in a clarifier tank having a baffle of the present invention; and FIGS. 10A-10D are a comparison of relative TSS reduction in the effluent channels in a clarifier tank having a baffle of the present invention against prior art baffles and tanks with no baffles.

DETAILED DESCRIPTION

In one embodiment, as illustrated in FIG. 1, an upward sloping density current baffle 10 is shown within a clarifier tank 12. As shown, clarifier tank 12 is a typical clarifier tank having a central tank portion T, and outer tank wall 14 and an effluent channel E. Density baffle 10 is typically located along outer wall 14 several feet (eg. 3 ft.) below the water level which is usually substantially aligned with the level of the spillway into the effluent channel.

It is understood that baffle 10 may be employed in other shaped tanks 12, (non-circular, square, rectangular, oval etc.) and may be employed at various heights along tank walls. However, for the purposes of illustration, the salient features of inverted density current baffle 10 are described below in conjunction with a typical round clarifier tank having a radius of substantially 100 ft, with a height of tank wall 14 ft.

In a first exemplary arrangement as shown in FIG. 2, density current baffle 10 maintains a central baffle portion 20 that is configured to be attached, at a lower end, to side wall 14. A series of mounting legs 50 may be periodically disposed along the bottom edge of central baffle portion 20 so a to allow connection to tank wall 14. The upper portion of central baffle portion 20 extends outwardly, away from side wall 14 towards the center of tank 12. A stiffening flange 51 is disposed along the side edges of portion 20 configured to provide added stability to baffle 10 under current conditions and also to provide connection and abutment surface for contacting adjacent central baffle portions 20 as discussed in more detail below. Preferably, central baffle portion 20 further maintains an upper connection flange 52 that is also configured to provide stability to baffle 10 under current conditions as well as to provide a connection means for attaching to an upper plate 28 of baffle 10.

In one embodiment of the present invention, as shown in FIG. 3, an upper plate 28 is a panel configured to adjoin against connection flange 52 of central baffle portion 20, thereby forming a closed baffle 10 against tank wall 14 as shown in FIG. 1. Such an arrangement assists in preventing sludge and other solid materials from building up behind the upward sloping central baffle portion 20, reducing the need for periodic cleaning.

As shown in FIG. 3, upper plate 28 maintains an integral side bracket 60 with wall attachment flange 61 configure to allow for attachment of upper plate 28 to tank wall 14. A lower edge connection flange 62 is provided for coupling to upper connection flange 52 of central baffle portion 20.

An upper wall flange 63 is also provided for attachment to tank wall 14. Along upper wall flange 63, a series of vents 65 may be employed to allow for flow of water and suspended solids behind upper plate 28 and connected central baffle portion 20 so that the solids do not get trapped behind baffle 10.

Vents 65 act as a relief conduit 24 which vents the pressure exerted by the buildup of gas which may accumulates in the space formed between upper panel 28, central baffle portion 20 and tank wall 14. Optionally, vents 65 may be provided with a venting flap 66. This venting flap 66 is positionable in a first open position when the pressure exerted by the buildup of gas reaches a predetermined level and positionable in a second closed position when the pressure exerted by the buildup of gas reaches a second predetermined level. Although upper panel 28 is shown with vents 65, it is understood that upper panesl 28, constructed with multiple vents, a single vent or no vents depending on installation and construction requirements, are also within the contemplation of the present invention.

FIG. 4 illustrates a side view of central baffle portion 20 and upper plate 28 coupled into baffle 10 and attached to side wall 14. Baffle 10 is formed when lower edge connection flange 62 of upper panel 28 is coupled to upper connection flange 52 of central baffle portion 20.

In the present arrangement as shown in FIG. 4, mounting legs 50, which are periodically disposed along the bottom edge of central baffle portion 20, are configured to support central baffle portion 20 away from tank wall 14. Thus, the bottom edge of central baffle portion 20 is not directly connected to tank wall 14 in a continuous manner but rather is coupled but held apart from tank wall 14 in a manner than allows solids and water to flow behind baffle 10. Thus, as shown in FIG. 4, the combination of mounting legs 50 of central baffle portions 20 and vents 65 of upper panels 28 result in baffle 10 allowing water and solids to freely flow through and behind baffle 10, preventing their capture behind baffle 10 which could result in unwanted trapping of gasses and solids.

In another arrangement of the present invention as shown in FIG. 4, the angle 21 at which central baffle portion 20 is disposed away from tank wall 14 is substantially 45°. However, the invention is not limited in this respect. Any angle of attachment to side wall 14 may be used that is sufficient to provide an improved flow of solid waste towards the center of tank 12 as discussed in more detail below.

In another exemplary arrangement, the angle 23 at which upper plate 28 is attached to side wall 14 is substantially 60°. However, the invention is not limited in this respect. Any angle of attachment to side wall 14 may be used that is sufficient to provide stable support and protection for baffle portion 20 as well as supporting the improved flow of solid waste towards the center of tank 12 is within the contemplation of the present invention.

It is noted that angles 21 and 23 may be modified for each installation based on various environmental conditions, including but not limited to physical tank dimensions, expected TSS content of water, expected sludge blanket thickness and height etc . . .

It is understood that central baffle portion 20, upper plate 28 and the accompanying components may be all integrally formed or may be fashioned as separate elements and put together during installation.

In a currently preferred implementation, the individual baffle 10 components are fabricated from a molded reinforced fiberglass composite as one-piece, unitarily-integrated units. Most preferably, the thickness of the fiberglass panels is in the range of from about 3/16th to 1/4th of an inch, a range that provides substantial structural strength and rigidity while remaining sufficiently lightweight for unusual ease of installation.

In another embodiment of the present invention, as illustrated in FIG. 5, the upward sloping central baffle portion 20 is configured attached to side wall 14 using a modified upper mounting bracket 29 instead of a full upper panel 28. This upper mounting bracket 29, unlike full upper panel 28, is not a full plate, but is instead some form of one or more frame brackets, thus leaving the upper side of baffle 10 open leaving only lower central baffle.

In another arrangement of the present invention, FIG. 6 shows upward sloping central baffle portion 20 that is retrofitted under a standard baffle of the prior art, as typically shown in either U.S. Pat. Nos. 5,252,205 or 5,597,483 to Schaller, both of which are incorporated herein by reference. In this configuration, central baffle portion 20 of the present invention is mounted or fixed against the underside of an existing flat baffle.

In another arrangement of the present invention, regardless of the details of construction set forth above, a series of central baffle portions 20 and upper plates 28 forming baffle 10 are configured to be supplied around the entire or substantial portion of the circumference of clarifier tank 12. For example, as shown in FIG. 7, upper plates 28 and central baffle portions 20 may be arranged in a consecutive manner with adjoining edges. Adjoining edges of baffles 10 may be bolted together and may optionally have overlapping/recessed edge notches for stability.

In addition to central baffle portions 20 and upper plates 28, such a consecutively mounted baffle 10 may further employ a common mounting brackets, whereby integral side bracket 60 of upper plate 28 of a first upper panel 28 and central baffle portion 20 may be employed to support the free end of an adjacent upper panel 28 and central baffle portion 20

In the arrangement shown in FIG. 7, central baffle portions 20 are interconnected and attached in an end-to-end arrangement so that each central baffle portion 20, when combined, form a smoothly continuous, upwardly and inwardly (i.e. toward the center or central portion of the clarifying tank T) sloping surface. The upper plates 28 are also similarly arranged.

Interconnection and securement of immediately-adjacent central baffle portions 20 and upper plates 28, during installation of the inventive baffle system 10 is effected in one embodiment by attaching a second lateral end of a first central baffle portion 20/upper plate 28 to an adjacent central baffle portion 20/upper plate 28, at the point of support from bracket 60.

In one arrangement as shown in close up FIG. 8A, an edge of upper plate 28 may be recessed (70) by an amount substantially corresponding to the thickness of a neighboring upper plate 28 so that when the first end of an adjacent upper plate 28 is abutted against the first central baffle portion, the two adjacently-abutting upper plates 28 form a smoothly-continuous surface by virtue of the shiplap-type joint through which they are interconnected as illustrated in FIG. 8B. This joint is formed above bracket 60 such that the same bracket 60 supports the adjoining edges of both upper panels 28. A securing bolt may be used to fasten adjacent upper plates 28 at these connection points. Similar uniform connections may be applied to adjacent central baffle portions 20.

Furthermore, brackets 60, optionally unitarily formed with upper panels 28 and the overlap connection joints advantageously permit appropriate adjustment, during installation of the inventive baffle system 10, of the relative positions of adjacently-disposed baffle members (20 and 28) to compensate for unanticipated irregularities in the curvature or contour of the clarifier tank wall 14.

As should be further apparent, the individual baffle members 20 and 28 are additionally secured to the clarifier tank wall via flange 63 (for upper panel 28) or fastening members 50 (for central baffle portions 20), by rivets or screws or other fasteners or the like. Securement of the individual baffle members to the tank wall 14 may be effected as each baffle element is attached to the next-adjacent baffle element in baffle system 10, or after a plurality of baffle members have been connected one-to-another, or in a combination or mixture of such steps as a general matter of design choice.

Using the design for baffle 10, as illustrated in the above FIG. 4 as an exemplary model, FIGS. 9A (Prior Art) and 9B shows a side by side comparison of the flow of solids from the bottom of the tank upwards towards the effluent channel of clarifier tank 12 of the present invention as compared to the Prior Art (FIG. 9A). As noted in the background, the main purpose of clarifier density baffles is to direct the current of solids back towards the center of tank 12 in order to reduce the flow of solid waste exiting into the effluent channel. As seen in FIG. 9B in the highlighted area "H" in the flow diagram, inverted density current baffle 10 of the present invention provides an improved solid flow back towards the center of the tank in comparison to the prior art (FIG. 9B) downward facing flat baffles which, while providing some center-ward direction of solids, allows a significant portion to curl back towards the effluent channel after flowing over the tip of the baffle.

FIGS. 10A-10D are charts, based on computer modeled flow results, showing the relative reduction in the concentration of suspended solids in the effluent channel. The first line on each of the charts, labeled NB, shows the test results for a clarifier tank having no density baffle. The second lines, labeled NEFCO DCB, shows the effluent TSS reduction using a standard downward slopping density baffle such as those described in the prior art.

FIG. 10A specifically relates to a test using standard peak loading (waste water entering bottom of tank) having a low sludge blanket. FIG. 10B shows the results for the test using the same standard loading but having a high sludge blanket. FIG. 10C shows the results for the test using a high loading (peak loading +20%) with a low sludge blanket. FIG. 10D shows the results for the test using the same high loading but having a high sludge blanket.

According to the model results, the prior art baffle reduces total suspended solids in manner consistent with actual test results from prior installations and assists in confirming that the test parameters were properly established.

According to one embodiment of the present invention, the lowest line in the chart on FIGS. 10A-10D, labeled 100A-100D respectively, represent the model test results for a baffle design 10 according to the present arrangement of density current baffle 10 having an upward sloping baffle portion 20, such as that shown in FIG. 4.

The following table 1 summarizes the results as compared to the prior art (DCB) arrangement

TABLE 1

| Percent Reduced Solids compared to Baseline | | |
|---|---|---|
| Operating Condition | DCB | Straight |
| Peak Hourly, Low Blanket | 27% | 60% |
| Peak Hourly, High Blanket | 18% | 77% |
| Peak Hourly plus 20%, Low Blanket | 37% | 95% |
| Peak Hourly plus 20%, High Blanket | 61% | 90% |
| Average | 35% | 80% |

These results demonstrate two significant advantages in the performance of density current baffle 10 over the prior art baffle(s) as follows.

First, the upward slopped density current baffle 10 reduced solids by and average of 80% over the case with no baffle, and 69% over the case of prior art straight baffle(s) tested in the same environment, both of which represent very significant improvements in clarifier performance.

Secondly, the wide variations in effluent solids on the "NB" (no baffle) and "NEFCO DCB" (prior art) graph lines early in the time sequence are caused by random transients that are induced by the model. In contrast, the upward sloping straight baffle, such as density current baffle 10, provides a damping action that limits the impact of these transients on effluent solids. This is particularly important in reducing solids overflow after events which disturb the normal flow rates such as heavy rain storms.

This improvement is further highlighted by the test results which show even larger percentage improvements in the high volume (peak +20%) instances in FIGS. 10C and 10D with 90% and 95% improvements over no-baffle designs and 92% and 74% over prior art baffle designs.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A density current baffle for use in a clarifier tank, said density baffle comprising:
    a first baffle portion having a lower end, an upper end and an intermediate central portion, said lower end of said baffle portion being coupled to a side wall of said clarifier tank, said upper end of said baffle portion being disposed, at a predefined angle, away from said side wall of said clarifier tank such that said first baffle portion slopes upwardly and away from said side wall, and wherein said upper end is configured to receive a mounting bracket, said mounting bracket having a first end coupled to said end flange and a second end coupled to said side wall of said tank wall, said mounting bracket being a downwardly sloping panel member which together with said first baffle portion form a substantially closed baffle, so that solid materials may be prevented from building up behind said upwardly sloping central baffle portion.

2. The density current baffle as claimed in claim 1, wherein said angle of attachment of said first baffle portion to said tank wall is substantially in the range of 35° to 60°.

3. The density current baffle as claimed in claim 1, wherein said angle of attachment of said first baffle portion to said tank wall is about 45 degrees.

4. The density current baffle as claimed in claim 1, wherein the clarifier tank has a water level, said baffle being located below the water level of the clarifier tank.

5. The density current baffle as claimed in claim 1, wherein the baffle further comprises an end attachment bracket intregally formed with the baffle as a one piece member.

6. The density current baffle as claimed in claim 5, wherein said baffle further comprises a rigidizing flange depending upward from said upper edge of baffle for providing enhanced rigidity to the baffle.

7. The density current baffle as claimed in claim 5, wherein the end attachment bracket further comprises a mounting flange securable to the tank wall and a mounting surface for receiving the first lateral side of the baffle of a next adjacent density current baffle.

8. The density current baffle as claimed in claim 1, wherein the peripheral wall of the clarifier tank has a radius of curvature, and wherein the lower end of the baffle has a radius of curvature which corresponds to the radius of curvature of the clarifier tank.

9. A density current baffle for use in a clarifier tank, said density baffle comprising:
    a first baffle portion having a lower end, an upper end and an intermediate central portion;
    an angled attachment bracket coupled to said first baffle portion for securing the baffle to the clarifier tank wall so that said upper end of said baffle portion is disposed, at a predefined angle, away from said side wall of said clarifier tank such that said intermediate central portion of said first baffle portion slopes upwardly and away from said side wall; and
    an upper plate having a lower edge connection for coupling said upper plate to said upper end of said first baffle portion and an upper wall flange for attachment of the upper plate to the side wall of said clarifier tank, said upper plate being disposed, at a predetermined angle, away from said side wall of said clarifier tank such that said upper plate slopes downwardly and away from said side wall.

10. The density current baffle as claimed in claim 9, wherein said attachment bracket is coupled to said baffle at a first end of said baffle.

11. The density current baffle as claimed in claim 9, wherein said attachment bracket is intregally molded with said baffle from a reinforced fiberglass composite.

12. A density current baffle for use in a clarifier tank, said density current baffle comprising:
    a first baffle portion having a lower end, an upper end and an intermediate central portion, said lower end of said baffle portion being coupled to a side wall of said clarifier tank, said upper end of said baffle portion being disposed, at a predefined angle, away from said side wall of said clarifier tank such that said first baffle portion slopes upwardly and away from said side wall; and
    an upper plate having a lower edge connection for coupling said upper plate to said upper end of said first baffle portion and an upper wall flange for attachment of the upper plate to the side wall of said clarifier tank, said upper plate being disposed, at a predetermined angle, away from said side wall of said clarifier tank such that said upper plate slopes downwardly and away from said side wall.

13. The density current baffle as claimed in claim 12, further comprising a relief vent mounted within said upper plate.

14. The density current baffle as claimed in claim 12, further comprising mounting legs for securing the lower end of said first baffle portion to said side wall so that said lower end of said first baffle portion is spaced apart from said tank wall so as to allow water to flow behind said baffle.

15. The density current baffle as claimed in claim 14, further comprising a plurality of relief vents mounted with said upper wall flange so as to allow water to flow behind said spaced apart first baffle portion and out of said plurality of relief vents in said upper plate.

16. The density current baffle as claimed in claim 12, wherein said upper end of said baffle portion is provided with an end flange for receiving a mounting bracket, said mounting bracket having a first end coupled to said end flange and a second end coupled to said side wall of said tank wall.

17. The density current baffle as claimed in claim 12, wherein said angle of attachment of said first baffle portion to said tank wall is substantially in the range of 35° to 60°.

* * * * *